United States Patent [19]

Leverenz

[11] 4,270,486
[45] Jun. 2, 1981

[54] POWDER DISPENSING APPARATUS
[75] Inventor: Melvin E. Leverenz, St. Clair, Mich.
[73] Assignee: Diamond Crystal Salt Co., St. Clair, Mich.
[21] Appl. No.: 115,672
[22] Filed: Jan. 28, 1980

Related U.S. Application Data
[63] Continuation-in-part of Ser. No. 39,262, May 16, 1979, abandoned.

[51] Int. Cl.³ .............................................. B05C 19/00
[52] U.S. Cl. ..................................... 118/679; 118/24; 118/303
[58] Field of Search .................... 118/676, 679, 24, 25, 118/16, 323, 308, 303, 680; 99/450.1

[56] References Cited
U.S. PATENT DOCUMENTS

| 874,570 | 12/1907 | Cairncross | 118/24 |
|---|---|---|---|
| 1,643,143 | 9/1927 | Wilcox | 118/308 X |
| 1,910,536 | 5/1933 | Guggenheim | 118/24 X |
| 2,119,910 | 6/1938 | Ferry | 118/24 X |
| 3,073,719 | 1/1963 | Albright, Jr. et al. | 118/323 X |
| 3,138,482 | 6/1964 | Gehl | 118/24 X |
| 3,703,382 | 11/1972 | Harkey | 118/16 X |
| 3,885,519 | 5/1975 | Orlowske | 118/24 X |

FOREIGN PATENT DOCUMENTS
8096 of 1890 United Kingdom ................. 118/308

Primary Examiner—John P. McIntosh
Attorney, Agent, or Firm—Harness, Dickey & Pierce

[57] ABSTRACT

A dispensing apparatus for dispensing metered quantities of a particulated material such as, for example, seasoning materials including salt, pepper or the like, in which the particulated material is discharged in the form of a substantially uniform curtainous stream and the articles or foodstuffs are transferred through the curtainous stream, a plurality of times to assure substantially uniform coating of the surfaces thereof. The apparatus includes slinger means for dispersing and propelling the articles through an upper section of the curtainous stream from the upstream to downstream side thereof and deflector means for intercepting and redirecting the articles back through the curtainous stream through an intermediate section thereof to the upstream side thereof. In accordance with a preferred embodiment, a conveyor is provided for receiving the articles passing through the intermediate section of the curtainous stream and transferring the articles back through the curtainous stream from the upstream to downstream side thereof, effecting multiple contact with the particulated material being dispensed. In accordance with a further preferred embodiment, the curtainous stream of particulated material is achieved by employing and endless foraminous flexible belt incorporating a plurality of cavities and supply means which fill the cavities with the particulated material to be dispensed. The particulated material in the cavities is gravitationally discharged at a position downstream from the supply means in the form of a curtainous stream.

18 Claims, 11 Drawing Figures

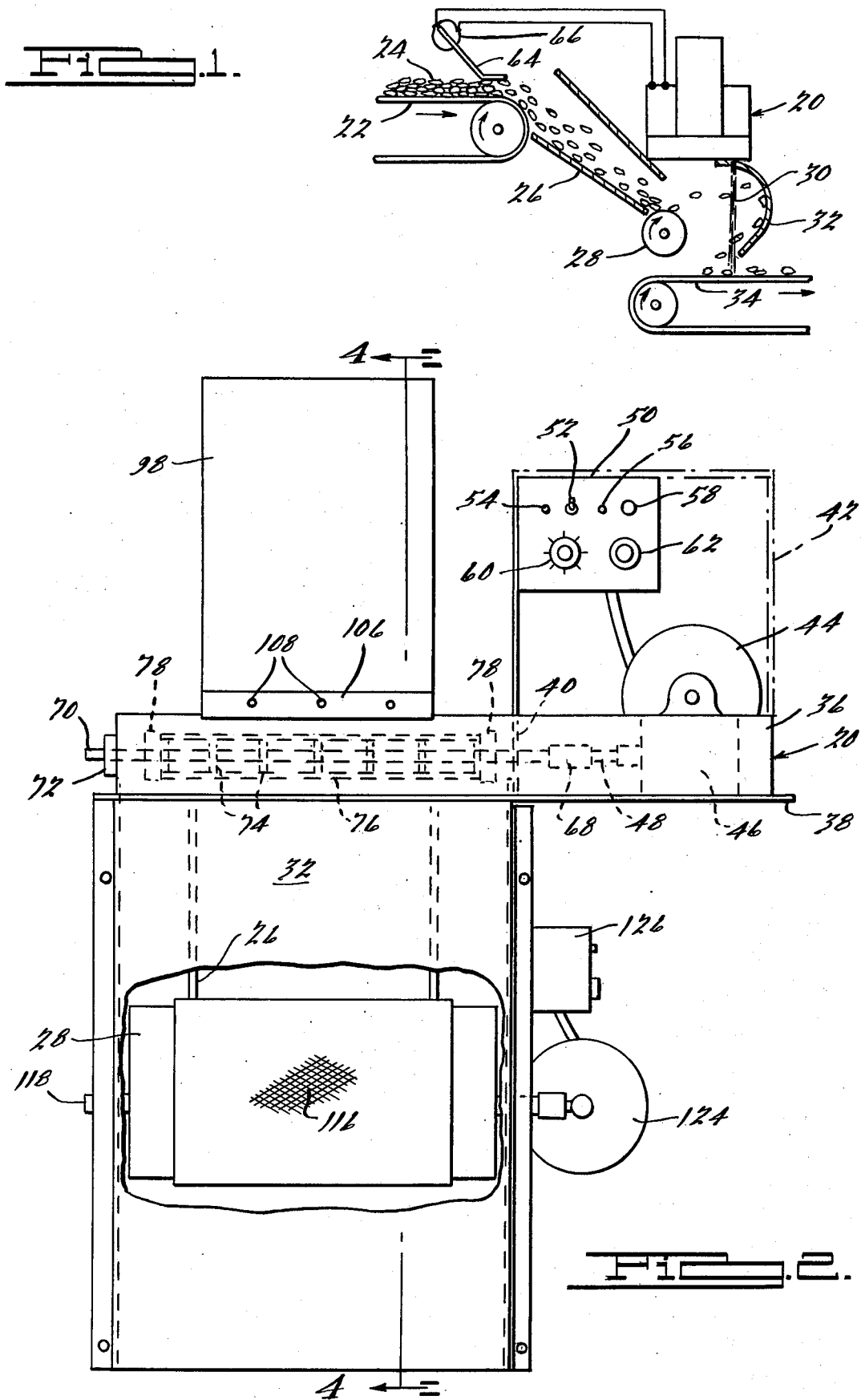

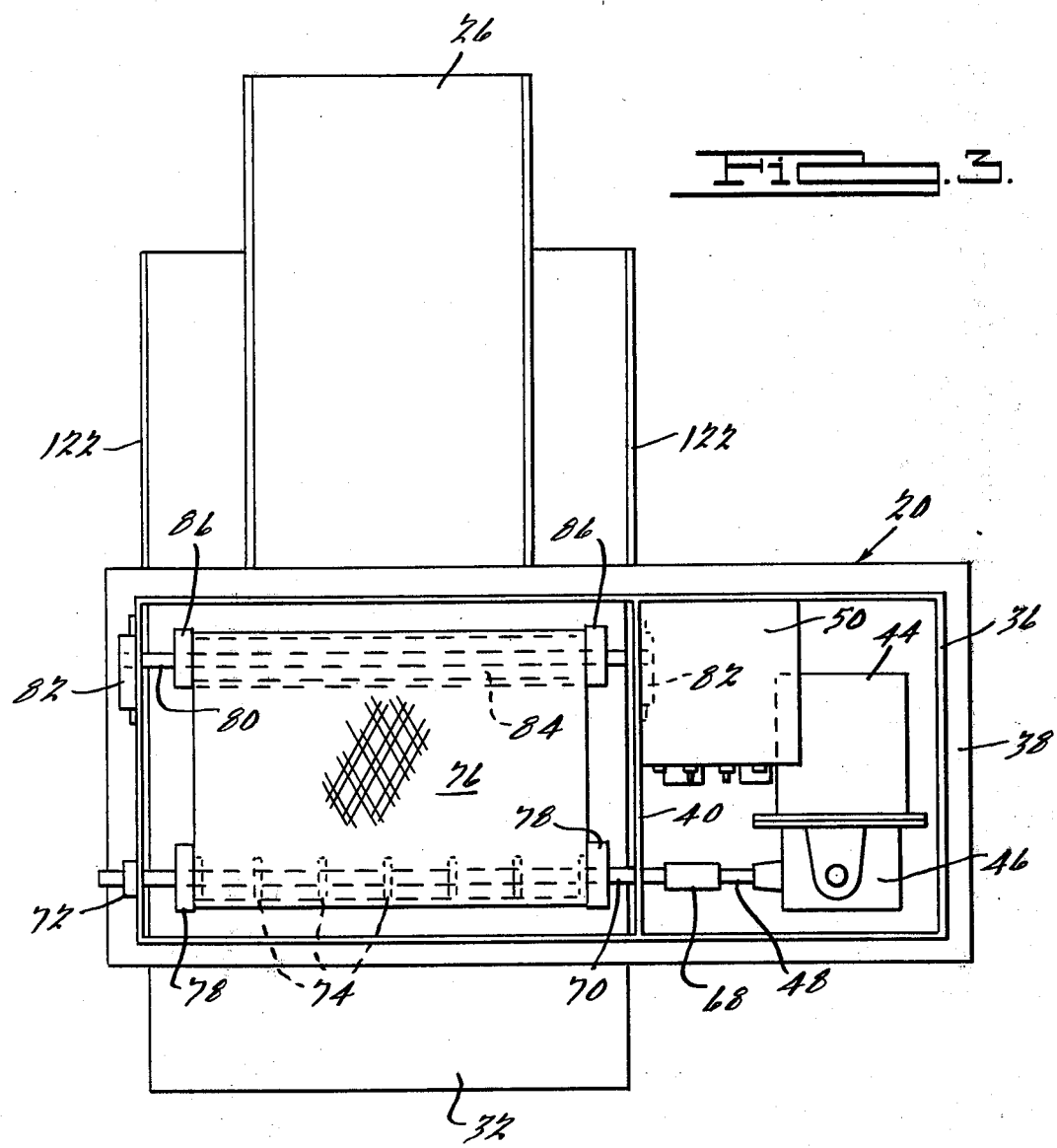

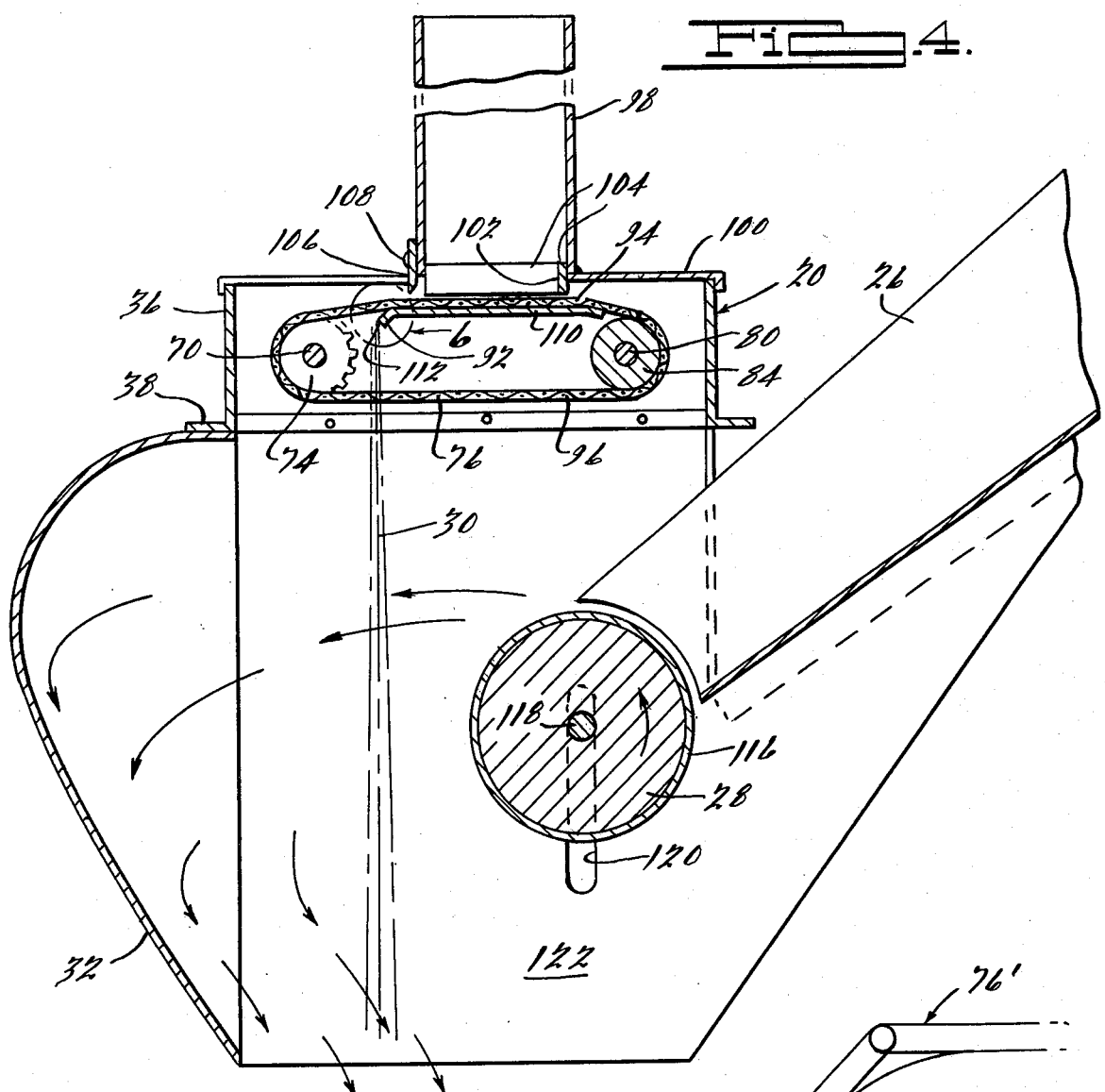
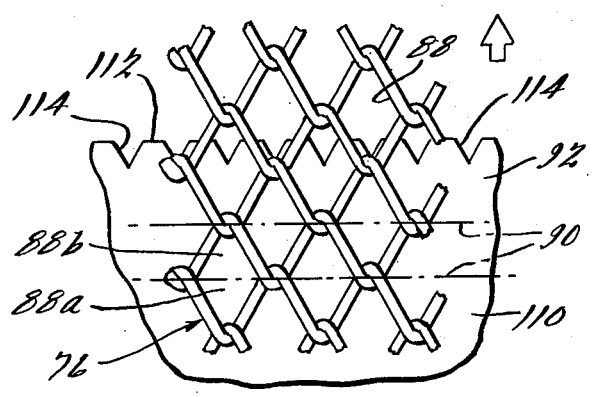
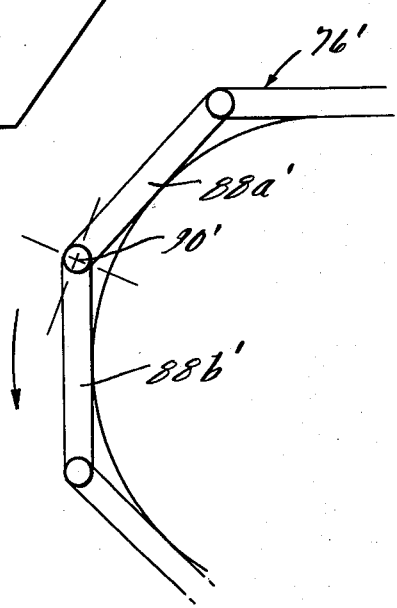

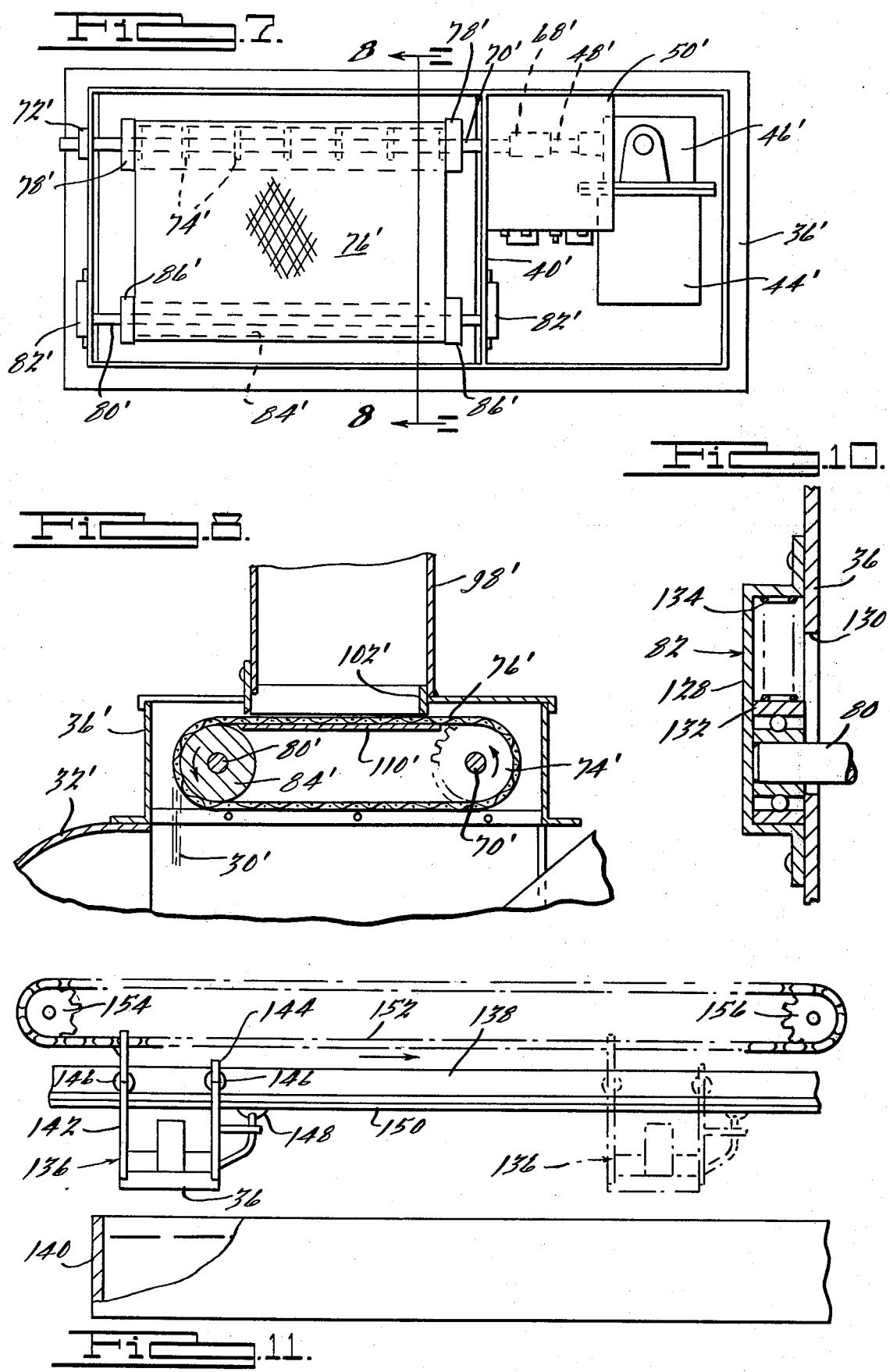

POWDER DISPENSING APPARATUS

CROSS-REFERENCES TO RELATED APPLICATIONS

This application is a continuation-in-part of prior copending application Ser. No. 039,262, filed May 16, 1979 for "Dispensing Apparatus", now abandoned.

BACKGROUND OF THE INVENTION

A variety of dispensing apparatuses have heretofore been used or proposed for use for dispensing dry particulated materials such as seasoning materials on foodstuffs to enhance their flavor. More particularly, various drum-type dispensers have heretofore been employed for the application of particulated salt on the surfaces of foodstuffs such as snack foods including potato chips, corn chips, corn curls, pork rinds, crackers and the like. A continuing problem associated with prior art dispensers has been the limitation on the types of particulated materials that can be dispensed and the failure to achieve uniformity in the quantity of the particulated material applied to each of the individual foodstuffs.

In the dispensing of common salt on foodstuffs, it has heretofore been commonplace to dispense such salt in a granulated form employing prior art-type dispensing devices. In many instances, salt in the form of flakes provide distinct advantages in the quality and taste of the foodstuffs in comparison to salt in a granulated form. Unfortunately, dispensing devices of the types heretofore known have been unsatisfactory for effecting a uniform and controlled dispensing of such flake salt which has detracted from a more widespread use thereof.

Problems have also been associated with prior art dispensing devices in their inability to automatically regulate the quantity of material being dispensed relative to changes in the quantity of foodstuffs passing the dispensing station. A further problem has been the difficulty in achieving a substantially uniform coverage of particulated material on all of the surfaces of the foodstuffs achieving uniform taste characteristics.

The present invention overcomes many of the problems and disadvantages associated with prior art dispensing devices by providing an apparatus which is of simple design and durable operation, which is of versatile use for dispensing a variety of different particulated materials, which is readily adaptable to automatic control for dispensing metered quantities of the particulated material as a function of the quantity of foodstuffs passing the dispensing station thereby achieving substantially constant quantities of dispensed material per foodstuff, which provides for a multiple contact of the foodstuffs with the particulated stream of material being dispensed assuring contact with all surfaces thereof assuring uniformity of the final product and which apparatus is of versatile use and adaptable to a variety of dispensing installations.

SUMMARY OF THE INVENTION

The benefits and advantages of the present invention are achieved by a dispensing apparatus which comprises a framework including discharge means for discharging a particulted material in the form of a generally vertically oriented curtainous stream. Slinger means are provided at a position upstream of the curtainous stream for dispersing and propelling the articles or foodstuffs through an upper section of the curtainous stream after which they are intercepted by deflector means disposed downstream of the curtainous stream and are redirected through an intermediate section of the curtainous stream back to the upstream side thereof, achieving a multiple contact with the particulated material. In accordance with a preferred embodiment, conveying means are provided for receiving the articles after passing beyond the upstream side of the curtainous stream and for conveying the articles through a lower section of the curtainous stream from the upstream to downstream side thereof achieving a further contact with the particulated material being dispensed. In accordance with still a further embodiment of the present invention, the dispensing or discharge means comprises an endless foraminous flexible belt incorporating a plurality of cavities therein which is movably mounted on the framework and guide means are provided for supporting the belt for travel in a path including an upper flight and a lower return flight. Supply means such as a hopper containing the particulated material to be dispensed is disposed adjacent to the surface of the upper flight for filling the cavities of the belt with a prescribed quantity of material in response to relative movement therebetween. Retaining means are provided for retaining the particulated material within the cavities during at least a portion of the travel of the belt downstream from the supply means and the retaining means terminate along an edge whereby the particulated material is gravitationally discharged from the cavities in the form of an upright substantially uniform curtainous stream.

In accordance with further preferred embodiments of the present invention, variable speed drive means are provided responsive to sensing means for controlling the speed of operation of the slinger means and of the discharge means to maintain the quantity of particulated material dispensed and the speed of operation of the slinger means in proportion to the quantity of articles or foodstuffs entering the dispensing apparatus.

Additional benefits and advantages of the present invention will become apparent upon a reading of the description of the preferred embodiments taken in conjunction with the accompanying drawings.

BRIEF DESCRIPTION OF THE DRAWINGS

FIG. 1 is a fragmentary, partly schematic and partly in section, side elevational view illustrating the powder dispensing apparatus of the present invention positioned at the outlet of a conveyor line for receiving articles such as foodstuffs;

FIG. 2 is a front elevational view with portions thereof broken away for clarity of the dispensing apparatus shown in FIG. 1;

FIG. 3 is a plan view of the dispensing apparatus shown in FIG. 2 with the hopper cover removed to expose the flexible belt and drive mechanism of the dispensing section;

FIG. 4 is a vertical sectional view of the dispensing apparatus shown in FIG. 2 as taken substantially along the line 4—4 thereof;

FIG. 5 is a magnified fragmentary plan view of a flexible wire link belt employed for dispensing the particulated material in the form of a curtainous stream;

FIG. 6 is a magnified fragmentary side elevational view of the flexible belt and edge of the retaining means as enclosed in the circle indicated at 6 in FIG. 4;

FIG. 7 is a fragmentary plan view of an alternative drive arrangement for the flexible belt in comparison to that shown in FIG. 3;

FIG. 8 is a transverse vertical sectional view of the arrangement shown in FIG. 7 and taken substantially along the line 8—8 thereof;

FIG. 9 is a magnified fragmentary side elevational view of the angular deflection of the flexible belt upon passing around the discharge end of the dispenser apparatus as shown in FIG. 8;

FIG. 10 is an enlarged sectional view of the resiliently biased bearing mounting employed in the arrangements illustrated in FIGS. 3 and 7; and FIG. 11 is a fragmentary side elevational view, partly schematic, of an alternative mobile installation of the dispenser apparatus of the present invention above a tank or receptacle.

DESCRIPTION OF THE PREFERRED EMBODIMENTS

Referring now in detail to the drawings, a typical installation of a dispenser apparatus 20 of the present invention is illustrated in FIG. 1, stationarily mounted adjacent to the discharge end of a conveyor belt 22 for conveying foodstuffs, such as potato chips 24 to the dispenser apparatus. It will be understood that while the dispensing apparatus as herein disclosed is particularly applicable for dispensing particulated or powdered materials on the surfaces of foodstuffs such as snack foods including potato chips, corn chips, corn curls, pork rinds, crackers, or the like, the apparatus is also applicable for dispensing alternative particulated materials on the surfaces of articles achieving a substantially uniform coating thereof.

In accordance with the specific arrangement illustrated in FIG. 1, the potato chips 24 are conveyed by the endless belt conveyor system 22 from a frying or cooking vat (not shown) and are discharged from the end thereof into a guide chute 26 mounted on the framework of the dispensing apparatus. The potato chips travel downwardly and are engaged by slinger means such as a rotatably mounted drum 28 in which they are separated and dispersed and are propelled through an upper section of a curtainous stream 30 of the particulated material being dispensed. Upon passing through the curtainous stream, the potato chips are intercepted and are redirected by arcuate deflector means 32 back through the curtainous stream 30 through an intermediate section thereof to the upstream side. Thereafer, in accordance with a preferred embodiment, the potato chips are received on a second belt conveyor system 34 and are transferred thereby back through a lower portion of the curtainous stream 30 to a suitable packaging station disposed downstream (not shown). It will be apparent from the foregoing arrangement, that the articles or potato chips undergo a multiple pass through the curtainous stream while oriented in different positions assuring substantially uniform exposure of all surfaces thereof to the particulated material being dispensed.

The specific structural and operating features of the arrangement as schematically illustrated in FIG. 1 will now be described in greater detail with particular reference to FIGS. 2 through 6. As shown, the dispensing apparatus 20 comprises a rectangular framework 36 including an outwardly extending flange 38 along the base thereof and the framework is subdivided into two compartments by an upright transverse partition 40. The compartment on the righthand side of the partition 40 as viewed in FIGS. 2 and 3 comprises the power and control systemm for dispensing the particulated material and is adapted to be enclosed by a removable cover 42 as shown in phantom in FIG. 2. Mounted within the power compartment is a reversible electric dc motor 44 which is of variable speed and which is drivingly coupled to a speed reducer 46 having a transverse output shaft 48.

A control box 50 is also mounted within the power compartment and incorporates an ac/dc converter for supplying direct current to the electric motor 44. The control box also includes a panel incorporating an on-off switch 52, an indicator light 54, a circuit breaker 56, a replaceable fuse 58, a motor speed control 60 and a selector switch 62 for controlling the direction of rotation of the motor. In accordance with a preferred arrangement, a sensing device as schematically illustrated in FIG. 1 is provided for sensing the quantity of articles or potato chips entering the dispensing apparatus to maintain the quantity of particulted material dispensed in proportion to the quantity of potato chips being processed assuring uniformity. As illustrated in FIG. 1, the sensing device includes a pivotly mounted arm 64 connected to a rheostat 66 for sensing the depth and quantity of potato chips 24 on the belt conveyor system 22. The rheostat 66 is electrically connected through a conventional control circuit (not shown) which in turn controls the speed of operation of the dc motor 44 effecting an increase or decrease from the preset speed. The rheostat 66 is connected in series through conventional circuitry with the motor speed control 60 to achieve the controlled variations in speed of the motor in proportion to the quantity of potato chips entering the dispensing apparatus.

The output shaft 48 of the speed reducer 46 as best seen in FIGS. 2 and 3 is connected by means of a coupling 68 to a driven shaft 70 having its remote end journaled by a bearing 72 affixed to the framework 36. A plurality of drive sprockets 74 are affixed at longitudinally spaced intervals on the driven shaft 70 and are disposed in engaged meshing relationship with the links of a flexible endless wire link belt 76. A pair of shouldered rollers 78 are affixed on the ends of the driven shaft 70 for engaging the side edges of the belt 76 maintaining it in appropriate alignment. An idler shaft 80 is rotatably supported by spring loaded bearing assebliess 82 secured to the framework and partition 40, respectively, for rotation about an axis substantially parallel to the axis of rotation of the driven shaft 70. A roller 84 is affixed to the idler shaft around which the belt extends. A pair of shouldered rollers 86 are positioned at each end of the roller 84 for engaging the side edges and guiding the path of travel of the belt.

The spring loaded bearing assemblies 82 maintain the belt in proper tension in accordance with the construction as subsequently described in further detail in connection with FIG. 10.

In accordance with the foregoing arrangement, an energization of the electric motor 44 effects rotation of the output shaft 48 of the speed reducer which in turn effects rotation of the driven shaft 70 and the sprockets 74 thereon, causing the flexible belt 76 to advance at a controlled rate of speed in a counter-clockwise direction as viewed in FIG. 4. In accordance with a preferred embodiment of the present invention, the flexible belt 76 is of a foraminous wire link construction comprising a series of interlocked spiral wires defining a plurality of diamond-shaped cavities 88. The material of which the belt is constructed is one that is compatible with the materials to be dispensed and preferably is also corrosion resistant. Belts comprised of wires composed of stainless-type steels are particularly preferred for this purpose. The belt as shown in FIG. 5 is adapted to travel in the direction as indicated by the arrow and the spiral wire interlocking arrangement provides for pivoting action and angular deflection of the wire about the transverse hinge axes indicated at 90, effecting an angular displacement of the leading and trailing edge portions of the diamond-shaped cavities 88 upon passing over a downwardly inclined ramp 92 as will subsequently be more fully described in connection with FIGS. 5 and 6 of the drawings. The angular displacement of the cavities facilitates a dislodgement of the particulated material disposed within the cavities 88 facilitating a discharge of the material in the form of the curtainous stream 30 as indicated in FIG. 4.

In the arrangement as illustrated in FIG. 4, the flexible belt 76 defines an upper flight 94 and a lower return flight 96. The particulated material to be dispensed is introduced over a controlled area of the flexible belt along the upper flight thereof by means of supply means such as an upright hopper 98 supported by a cover plate 100 overlying the edges of the framework 36 as best seen in FIGS. 2 and 4. The hopper comprises a three dimensional enclosure as defined by upright side and end walls which are preferably disposed so as to taper outwardly in a downward direction providing for an increase in the cross-sectional area of the hopper on moving downwardly toward the belt thereby avoiding any bridging or hang-up of the particulated material therein.

The base of the hopper 98 and the cover plate 100 terminates in a rectangular discharge port 102 which is of a transverse width less than the width of the flexible belt. The transverse sides and the upstream edge of the discharge port 102 are formed with depending walls 104 as indicated in FIG. 4 which terminate at their lower edges at a position contiguous to the upper surface of the belt. The forward or downstream edge of the discharge port is formed with a transversely extending doctor blade or knife 106 which is vertically adjustable by means of screws 108 to control the depth of particulated material deposited on the belt and within the cavities thereof in response to relative movement of the belt past the discharge port. When a foraminous belt such as the link belt 76 shown in FIG. 5 is employed, retaining means such as a shield or supporting member 110 as best seen in FIG. 4 is positioned contiguous to the underside of the upper flight of the belt from a position upstream of the upstream edge of the discharge port and terminating at a position downstream of the knife 106 as defined by a substantially transversely extending edge 112. The provision of the shield 110 serves to retain the particulated material within the cavities of the belt during its advancing movement beyond the supply means.

As best seen in FIGS. 4, 5 and 6, the downstream end portion of the sheild 110 defining the edge 112 is angularly inclined downwardly to form the ramp 92 for effecting a flexing of the belt as it passes thereover. The edge 112 is also preferably formed with a plurality of V-shaped notches 114 as shown in FIG. 5 in order to achieve a more uniform discharge of the particulated material and to provide for a broader curtainous stream. Upon attaining the discharge edge of the shield, the particulated material within the cavities of the belt becomes dislodged and falls by the action of gravity downwardly in the form of the curtainous stream 30 which is of a controlled transverse width depending upon the width of the discharge port 102 in the hopper. The flexible hinged construction of the belt serves to angularly deflect the diamond-shaped cavities 88 as shown in FIGS. 4 and 6 from a planar configuration while disposed beneath the hopper 98 to an angularly deflected condition as schematically illustrated in FIG. 6 whereby the bridging tendency of certain materials such as flake salt, for example, is overcome by the deflection of the walls defining each cavity causing the particulated material to drop through the action of gravity. As shown in FIG. 6, the trailing edge portion of each diamond-shaped cavity 88 indicated at 88a in FIG. 6 is angularly deflected with respect to the leading edge portion 88b of the cavity by virtue of the hinging action of the belt about the hinge axes thereby overcoming the bridging action of the pulverent or particulated material within the cavity. The dislodged particulated material drops downwardly passing through the empty cavities of the lower flight of the belt which serves to effect a further dispersing of the material to form the curtainous stream 30.

It will be appreciated from the foregoing, that the quantity of particulated material dispensed from the discharge end of the dispensing apparatus will vary as a function of the linear speed of travel of the flexible belt, to the size and depth of the cavities therein, and the width of the discharge port of the hopper. The size of the cavities and their depth will also be dictated to some extent by the size and nature of the particulated material being dispensed. For a fine-sized flake salt, for example, wire link belts of a nominal thickness of about one-eighth inch and of a mesh size of about 7 to about 8 formed from stainless steel wire of from about 20 to about 22 gauge have provided satisfactory dispensing of the material in the form of a substantially uniform and continuous curtainous stream. Alternative mesh sizes and belt thicknesses can be employed to achieve similar satisfactory results with alternative particulated materials.

Referring now to FIGS. 1-4 of the drawings, the chips 24 enter the dispensing apparatus by moving downwardly within the chute 26 which is oriented to discharge the chips on the upper peripheral portion of the drum 28 as shown in FIG. 4. The drum 28 is of a circular cylindrical cross-section and is provided with a textured pad 116 around the periphery thereof for frictionally engaging the entering chips and effecting a dispersing and acceleration thereof for passage through the upper section of the curtainous stream 30 in the direction of the arrows as indicated in FIG. 4. The drum 28 is rotatably mounted on a shaft 118 disposed substantially parallel to the plane of the curtainous stream and is vertically positionable in slots 120 provided in sidewalls 122 secured to the underside of the framework 36. The drum is rotated at a controlled speed by drive means including a speed reducer 124 drivingly connected to an electric motor of a dc type similar to the drive arrangement employed for moving the flexible belt. The drum drive mechanism also contains a control box 126 substantially identical to the control box 50 previously described for regulating the speed of rotation of the drum. It is also contemplated in accordance with a preferred embodiment of the present invention, that the pivotally mounted arm 64 illustrated in FIG. 1 of the sensing device can be connected to a second rheostat such as the rehostat 66 which in turn is electrically connected to the speed control of the control box 126 whereby the speed of rotation of the drum is varied in proportion to the quantity of chips entering the dispensing aparatus.

The speed of operation of the drum is controlled so that the chips are accelerated upon contact with the textured pad and are thrown in a tumbling manner through the upper section of the curtainous stream as shown in FIG. 4 passing from the upstream to downstream side thereof after which they are intercepted by the arcuate deflector 32 and are redirected through an intermediate section of the curtainous stream from the downstream to upstream side thereof achieving a multiple pass. The arcuate deflector 32 as shown in FIGS. 2 and 4 is secured along its upper edge to the underside of the flange 38 of the framework and along its vertical sides to the forward edges of the sidewalls 122. The sidewalls in combination with the arcuate deflector define a dispensing chamber through which the chips pass and fall downwardly through the action of gravity back on a suitable belt conveyor system 34 as shown in FIG. 1 in which they can again be transferred through a lower section of the curtainous stream for a final salting operation.

An alternative satisfactory drive and guide mechanism for the flexible belt is illustrated in FIGS. 7–9 in which the curtainous stream of particulated material is discharged from the forward arcuate edge of the belt. The mechanism of FIGS. 7–9 is identified with the same numerals as previously employed in connection with FIGS. 2–6 but with a prime affixed thereto. As shown, a framework 36' divided by a partition 40' supports a variable speed dc motor 44' drivingly connected to a speed reducer 46' having its output shaft 48' connected by a coupling 68' to a driven shaft 70'. The driven shaft 70' is supported by a bearing 72' at its remote end. A control box 50' identical to the control box 50 previously described is electrically connected to the motor for controlling the speed of the driven shaft and linear speed of the flexible belt 76'. A plurality of drive sprockets 74' are mounted on the driven shaft and incorporate shouldered rollers 78' at the ends of the driven shaft for engaging and guiding the belt 76'.

An idler shaft 80' is rotatably supported at its ends by spring loaded bearing assemblies 82' for maintaining proper belt tension. The idler shaft further includes a cylindrical roller 84' and end shouldered rollers 86' for supporting and guiding the belt. A shield 110' is disposed beneath and contiguous to the underside of the upper flight of the flexible belt from a position upstream of the discharge port 102' in the base of the hopper 98' and extends to substantial sealing contact with the periphery of the roller 84' at the downstream end thereof. According to this arrangement, the powdered material or salt entering the cavities of the flexible belt 76' are retained until the belt passes around the arcuate discharge end as defined by the roller 84' whereby the particulated material is discharged in the form of a curtainous stream 30'. The hinged construction of the flexible foraminous belt 76' as previously described causes the diamond shaped cavities therein to angularly deflect upon passing around the arcuate curvature of the forward roller 84' in a manner as best shown in FIG. 9 whereby the trailing edge portions 88a' are angularly deflected with respect to the leading edge portions 88b' of the cavities by virtue of the hinging action about the hinge axes 90' facilitating dislodgement of the particulated matrials from within the cavities. The dispensing apparatus in accordnce with the alternative embodiment can similarly incorporate the slinger means and arcuate deflector 32' as fragmentarily shown in FIG. 8 for the purposes as previously described in connection with the dispensing apparatus of FIGS. 1–6. The operation and control of the alternative embodiment is also identical with that previously described.

Referring now to FIG. 10 of the drawings, a longitudinal horizontal sectional view of a spring loaded bearing assembly 82 is illustrated for supporting the idler shaft 80 of the arrangement illustrated in fIG. 3 which is equally applicable to the embodiment of FIGS. 7–9. As shown, the assembly comprises a rectangular casing 128 secured to the outer sidewall of the framework 36 or tranverse partition 40, as the case may be, which is formed with an elongated horizontal slot 130 to provide for longitudinal shifting movement of the shaft 80. An antifriction bearing 132 is disposed within the casing and is positioned with the inner surface thereof in sliding bearing contact against the wall of the framework 36. A coil spring 134 extends between an end wall of the casing and the bearing 132 continuously biasing the bearing and the idler shaft carried thereby under a preselected stress to maintain the flexible belt at a desired tension.

While the embodiments of the dispensing apparatus of the present invention has hereinbefore been described with particular reference to a stationary installation such as illustrated in FIG. 1 for salting potato chips, it will be appreciated that the dispensing apparatus can also be mounted for relative movement to deposit a preselected quantity of material on a movable or stationary object or foodstuff. In such an installation, the arcuate deflector, sidewalls, chute and rotary drum depending from the framework 36 can be removed. For example, as illustrated in FIG. 11, a dispensing apparatus 136 of the same types as previously described can be movably supported from a monorail 138 extending longitudinally of a tank or vat 140 containing a prepared foodstuff. The apparatus 136 is suspended by means of uprights 142, 144, each incorporating rollers 146 rotatably mounted on the upper ends thereof and disposed in rolling supported contact on the monorail. The lower ends of the uprights are connected to the framework 36 of the dispensing apparatus. Energization of the variable speed dc motor in the dispensing apparatus can suitably be achieved by a contact brush 148 disposed in sliding electrical contact with an electrified rail or rails 150 mounted on the underside of the monorail 138. A traversing movement of the dispenser above the open vat 140 from a position as shown in solid lines to a position as shown in phantom can be achieved by a conveyor or transfer chain 152 having a link thereof connected to the upstanding end of the upright 142 and which extends in an endless manner and is trained about a pair of sprockets 154, 156.

The arrangement as illustrated in FIG. 11 is typical for the addition of carefully controlled quantities of flake salt to a molten mass of cheese contained in the vat 140 in which the curtainous stream of salt being dispensed is oriented transversely to the direction of traversing movement of the dispensing apparatus. In accordance with this arrangement, a substantially uniform dispensing of the particulated material is achieved over the entire surface area of the contents of the vat avoiding localized areas of high concentration or stratification of such materials as has been encountered in the manual dispensing of such particulated materials in spite of agitation of the mass within the vat.

While it will be apparent that the invention herein disclosed is well calculated to achieve the benefits and advantages as hereinabove set forth, it will be appreciated that the invention is susceptible to modification, variation and change without departing from the spirit thereof.

What is claimed is:

1. A dispensing apparatus for dispensing a particulated material on the surfaces of articles comprising a framework, discharge means for discharging a particulated material in the form of a transversely extending generally vertically oriented curtainous stream, slinger means disposed upstream of said curtainous stream for dispersing and propelling the articles through the upper section of said stream, and deflector means disposed downstream of said curtainous stream for intercepting and directing the articles back through an intermediate section of said stream to the upstream side thereof.

2. The apparatus as defined in claim 1 further including conveying means for receiving the articles after passing through said intermediate section of said curtainous stream and conveying the articles through a lower section of said stream from the upstream to downstream side thereof.

3. The apparatus as defined in claim 1 further including means for receiving and directing the articles to said slinger means.

4. The apparatus as defined in claim 1 further including first control means for controlling the quantity of particulated material dispensed by said discharge means.

5. The apparatus as defined in claim 1 further including second control means for controlling the speed of operation of said slinger means.

6. The apparatus as defined in claim 1 in which said slinger means comprises a drum rotatably mounted on said framework for rotation about an axis transverse to the direction of travel of the articles.

7. The apparatus as defined in claim 6 in which the periphery of said drum is formed with means for engaging and propelling the articles in response to rotation of said drum.

8. The apparatus as defined in claim 6 further including means for discharging the articles on the upper peripheral portion of said drum.

9. The apparatus as defined in claim 6 further including variable speed drive means for varying the speed of rotation of said drum.

10. The apparatus as defined in claim 1 further including sensing means for sensing the quantity of articles entering said apparatus and first control means responsive to said sensing means for controlling the quantity of particulated material dispensed by said discharge means in proportion to the quantity of articles entering said apparatus.

11. The apparatus as defined in claim 1 further including sensing means for sensing the quantity of articles entering said apparatus and second control means responsive to said sensing means for controlling the speed of operation of said slinger means in proportion to the quantity of articles entering said apparatus.

12. The apparatus as defined in claim 1 in which said discharge means comprises an endless flexible belt incorporating a plurality of cavities therein movably mounted on said framework to define an upper flight and a lower return flight, supply means for discharging a particulated material into the cavities of said upper flight, guide means for guiding movement of said upper flight along a path adjacent to said supply means to a position spaced downstream therefrom, retaining means disposed adjacent to the underside of said upper flight for retaining the particulated material in said cavities, said retaining means terminating along a line spaced downstream from said supply means and disposed substantially transverse to the direction of travel of said belt to enable gravitational discharge of said material from said cavities in the form of said curtainous stream.

13. The apparatus as defined in claim 12 in which said retaining means comprises a member disposed adjacent to the under side of said upper flight and terminating in an edge lying along said line.

14. The apparatus as defined in claim 13 in which said edge of said member is of an irregular sawtooth configuration.

15. The apparatus as defined in claim 13 in which said member is of a substantially planar configuration formed with a downwardly inclined portion extending along said edge to facilitate discharge of the particulated material from said cavities.

16. The apparatus as defined in claim 15 in which said belt is of a wire link construction in which each of said cavities is defined by the surrounding wire structure which is pivotly interlocked along a hinge axis extending transversely of the direction of travel of said belt, said hinge axis passing through each said cavity at a position intermediate the leading and trailing portions thereof to effect relative angular deflection of said leading and said trailing portions upon passing over said downwardly inclined portion along said edge.

17. The apparatus as defined in claim 12 in which said retaining means comprises a member disposed adjacent to the underside of said upper flight and said guide means includes roller means at the downstream end of said upper flight for arcuately guiding said belt around an arcuate discharge end disposed along said line.

18. The apparatus as defined in claim 17 in which said belt is of a wire link construction in which each of said cavities is defined by the surrounding wire structure which is pivotally interlocked about a hinge axis extending transversely of the direction of travel of said belt, said hinge axis passing through each said cavity at a position intermediate the leading and trailing portions thereof to effect relative angular deflection of said leading and said trailing portions upon passing around the arcuate said discharge end.

* * * * *